(12) United States Patent
Yamashita (10) Patent No.: US 9,366,450 B2
(45) Date of Patent: Jun. 14, 2016

(54) AIR ADJUSTER

(75) Inventor: Hiroyasu Yamashita, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 563 days.

(21) Appl. No.: 13/808,534

(22) PCT Filed: May 30, 2011

(86) PCT No.: PCT/JP2011/062349
§ 371 (c)(1),
(2), (4) Date: Jan. 4, 2013

(87) PCT Pub. No.: WO2012/005067
PCT Pub. Date: Jan. 12, 2012

(65) Prior Publication Data
US 2013/0109292 A1  May 2, 2013

(30) Foreign Application Priority Data

Jul. 5, 2010 (JP) ................................. 2010-153274

(51) Int. Cl.
*F24F 7/007* (2006.01)
*F24F 7/08* (2006.01)
(Continued)

(52) U.S. Cl.
CPC ................ *F24F 7/08* (2013.01); *F24F 3/1603* (2013.01); *F24F 3/166* (2013.01); *F24F 2001/0096* (2013.01); *F24F 2003/1664* (2013.01); *F24F 2003/1682* (2013.01); *F24F 2221/12* (2013.01)

(58) Field of Classification Search
CPC ................ F24F 7/08; F24F 2003/1682; F24F 2001/0096; F24F 221/12; F24F 3/1603; F24F 3/166; F24F 2003/1664

USPC .......................................... 454/249, 234, 241
See application file for complete search history.

(56) References Cited

U.S. PATENT DOCUMENTS 5,035,728 A * 7/1991 Fang ....................... B03C 3/019
  422/120
5,087,004 A * 2/1992 Lundell et al. ................ 248/126
(Continued)

FOREIGN PATENT DOCUMENTS

CA    2387996 A1 * 5/2001 ......... B01D 46/0005
CN   201436490 U    4/2010
(Continued)

OTHER PUBLICATIONS

International Search Report issued in PCT/JP2011/062349 mailed Aug. 23, 2011.

*Primary Examiner* — Steven B McAllister
*Assistant Examiner* — Frances F Hamilton
(74) *Attorney, Agent, or Firm* — Birch, Stewart, Kolasch & Birch, LLP (57) ABSTRACT

Provided is an air adjuster that maintains low-noise performance of back-inlet types and allows realization of efficient airflow from the front side toward the back side thereof and prevents the occurrence of stagnant air. The air adjuster includes a housing in which air inlets and an air outlet are formed; a blower that sucks in air through the air inlets; and a conditioning unit that conditions the air sucked in by the blower. The air inlets are located on the back side of the housing, and the air conditioned by the conditioning unit is blown to the outside through the air outlet. The housing allows the air to pass through a space between a bottom surface thereof and a placement surface, and the housing is provided with leg units that form a gap whose vertical dimension on the front side is smaller than that on the back side.

6 Claims, 9 Drawing Sheets

(51) Int. Cl.
  *F24F 3/16* (2006.01)
  *F24F 1/00* (2011.01)

(56) References Cited

U.S. PATENT DOCUMENTS

| | | | | |
|---|---|---|---|---|
| 5,230,720 | A * | 7/1993 | Kendall | B01D 46/008 55/385.1 |
| 5,250,232 | A * | 10/1993 | Pepper | F24F 6/043 261/107 |
| 5,803,940 | A * | 9/1998 | Rick | B01D 46/10 248/188.8 |
| 5,840,092 | A * | 11/1998 | Rick | B01D 46/10 55/472 |
| 6,017,375 | A * | 1/2000 | Duell et al. | 55/356 |
| D420,732 | S * | 2/2000 | Gudefin | D23/364 |
| 6,494,940 | B1 * | 12/2002 | Hak | A61L 9/16 55/471 |
| 7,179,425 | B2 * | 2/2007 | Yuen | B03C 3/016 422/121 |
| 7,537,647 | B2 * | 5/2009 | Adair | B01D 45/06 261/DIG. 88 |
| 7,713,339 | B2 * | 5/2010 | Johansson | 96/417 |
| 7,752,862 | B2 * | 7/2010 | Bae | 62/262 |
| 2003/0206840 | A1 * | 11/2003 | Taylor et al. | 422/186.04 |
| 2004/0123739 | A1 * | 7/2004 | Jan | B03C 3/08 96/18 |
| 2009/0100850 | A1 * | 4/2009 | Yasukawa | A61L 9/22 62/259.1 |

FOREIGN PATENT DOCUMENTS

| | | | |
|---|---|---|---|
| JP | 64-11620 A | | 1/1989 |
| JP | 1-139119 A | | 5/1989 |
| JP | 2-37232 A | | 2/1990 |
| JP | 3-254808 A | | 11/1991 |
| JP | 10-156215 A | | 6/1998 |
| JP | 11-94318 A | | 4/1999 |
| JP | 11-156235 A | | 6/1999 |
| JP | 11-94318 | * | 9/1999 |
| JP | 2000-121111 A | | 4/2000 |
| JP | 2001-338744 A | | 12/2001 |
| JP | 2004 16942 A | * | 1/2004 |
| JP | 2004-16942 A | | 1/2004 |
| JP | 2007-21353 A | | 2/2007 |
| JP | 2009-30953 A | | 2/2009 |
| JP | 2009-85511 A | | 4/2009 |

* cited by examiner

FIG. 9 ions using activated carbon or the like. Therefore, air purifiers have the following basic structure.

AIR ADJUSTER

This application is the national phase under 35 U.S.C. §371 of PCT International Application No. PCT/JP2011/062349 which has an International filing date of May 30, 2011 and designated the United States of America.

FIELD

The present invention relates to an air adjuster, such as an air purifier or a humidifier, for adjusting the purity, humidity, and the like of air.

BACKGROUND

Air in a room is contaminated with various substances such as dust, tobacco smoke, and carbon dioxide exhaled by respiration. Because modern houses are highly airtight, such contaminants tend to accumulate in a room, so that it is necessary to actively ventilate air in a room. However, for houses and offices in comparatively heavily air-polluted areas, it is not preferable to ventilate air through a window, because polluted air is undesirably taken into a room. For houses and the like in less air-polluted areas, pollen may be taken into a room depending on the season, which is not desirable for people suffering from hay fever.

Accordingly, air purifiers of types placed on a floor or a table are used to purify air without opening a window. A typical method of purifying air in a room is to suck in air, collect dust and the like using a filter, and absorb contaminants using activated carbon or the like. Therefore, air purifiers have the following basic structure.

An air passage in which a blower is disposed is formed in a body of an air purifier. An air inlet is disposed at the entrance of the air passage, and an air outlet is disposed at the exit of the air passage. A dust filter and a deodorizing filter are disposed in the air passage to remove dust, unpleasant odors, and the like. Moreover, an ion generating unit is disposed in the air passage, and ions generated by the ion generating unit are released into a room together with purified air. Airborne mold, bacteria, and the like in the room are inactivated as a result of being surrounded by the released ions. Thus, the air purifier purifies air in a room (see, for example, Japanese Unexamined Patent Application Publication No. 2000-121111).

Because apparatuses have been designed to provide a better low-noise performance, there are air purifiers having air inlets structured in various ways. The apparatus described in Japanese Unexamined Patent Application Publication No. 2000-121111 is a front-inlet-type apparatus having an air inlet in a front surface thereof.

However, in general use, air purifiers are placed on a floor surface near a wall while a user is present in a middle part of the room. Therefore, back-inlet-type apparatuses, which have an air inlet in a back surface thereof to reduce air intake noise of the blower heard by a user, are also marketed (see, for example, Japanese Unexamined Patent Application Publication No. 2009-085511).

SUMMARY

With the existing technologies described above, the front-inlet-type apparatus efficiently sucks in contaminated air in a room, including air on the lower front side of the apparatus. However, the noise level for a user during operation is high because the blower air intake noise directly enters the user's ears. In contrast, the back-inlet-type apparatus has a good low-noise performance. However, air on the lower front side of the apparatus is not easily sucked in, so that contaminated air in a room remains stagnant in a region surrounding the apparatus.

An object of the present invention, which has been achieved under the circumstances described above, is to provide an air adjuster that can restrict an increase in the noise level thereof, realize efficient airflow from the lower front side toward the back side thereof, and prevent the occurrence of stagnant air.

An air adjuster according to the present invention includes a housing in which an air inlet and an air outlet are formed; a blower that is disposed in the housing and that sucks in air through the air inlet; and a conditioning unit that is disposed in the housing and that conditions the air sucked in by the blower. The air that has been conditioned by the conditioning unit is blown to the outside through the air outlet. The air inlet is formed in a back surface or in a side surface of the housing. The housing allows the air to pass through a space between a bottom surface thereof and a placement surface, and the housing is provided with a leg unit that forms a gap whose vertical dimension on a front side is smaller than a vertical dimension on a back side.

According to the present invention, the housing, which has the air inlet formed in the back surface or the side surface thereof, is supported by the leg unit, and the gap, through which air can pass and whose vertical dimension on the front side is smaller than the vertical dimension on the back side, is formed between the bottom surface of the housing and the placement surface. When the blower is activated and air is sucked in through the air inlet in the back surface or the side surface of the housing and airflow toward the air inlet is generated, air on the lower front side of the housing flows through the gap between the bottom surface and the placement surface toward the back surface or the side surface, and the air is sucked in through the air inlet in the back surface or the side surface together with air that has flowed around the housing. The sucked-in air is conditioned by the conditioning unit and is blown to the outside through the air outlet. Thereafter, such sucking and blowing of air are performed repeatedly.

In the air adjuster according to the present invention, at least one of a lower end portion of a front surface and a front end portion of the bottom surface of the housing may be formed as an inclined surface or a curved surface that is connected to the other of the lower end portion of the front surface and the front end portion of the bottom surface.

With the present invention, air on the front side of the housing flows along the inclined surface or the curved surface, which is formed at the connection portion between the lower end portion of the front surface of the housing and the front end portion of the bottom surface of the housing, and the air smoothly flows into the gap between the bottom surface of the housing and the placement surface.

In the air adjuster according to the present invention, the leg unit may be a plurality of legs that are disposed at least at three positions on the bottom surface of the housing.

With the present invention, the plurality of legs, which are formed at least at three positions on the bottom surface of the housing, form the gap between the bottom surface of the housing and the placement surface, and air on the lower front side of the housing flows through the space between the leg units toward the back side.

In the air adjuster according to the present invention, the leg unit may be a wall member that extends in a ring-like shape along a peripheral edge of the bottom surface of the housing so as to face downward, the wall member having an opening formed in each of a front surface and a back surface thereof or in each of the front surface and a side surface thereof.

With the present invention, the wall member, which extends in a ring-like shape along the peripheral edge of the bottom surface of the housing so as to face downward, forms the gap between the bottom surface of the housing and the placement surface, and air on the lower front side of the housing flows toward the back side through both openings formed in the front surface and the back surface of the housing or through both openings formed in the front surface and the side surface of the housing.

With the present invention, air on the lower front side of the housing flows toward the back side through the gap between the bottom surface and the placement surface, and the air is sucked in through the air inlet formed in the back surface or the side surface. As a result, an air adjuster is provided that can restrict an increase in the noise level thereof as compared with a front-inlet type, realize efficient airflow from the lower front side toward the back side thereof, and prevent the occurrence of stagnant air.

Moreover, with the present invention, the vertical dimension of the gap between the bottom surface of the housing and the placement surface on the front side is smaller than the vertical dimension on the back side. As a result, an air adjuster is provided with which dust and the like on the floor surface are sucked up with a higher power because the gap on the front side, which is narrow, serves as a nozzle and increases the airflow speed and with which the aesthetic in appearance can be improved because the leg unit disposed on the bottom surface of the housing is difficult to see from the front side.

The above and further objects and features will more fully be apparent from the following detailed description with accompanying drawings.

DETAILED DESCRIPTION

Hereinafter, embodiments of an air adjuster according to the present invention will be described with reference to the drawings by using an air purifier as an example.

(First Embodiment)

Figure 1:
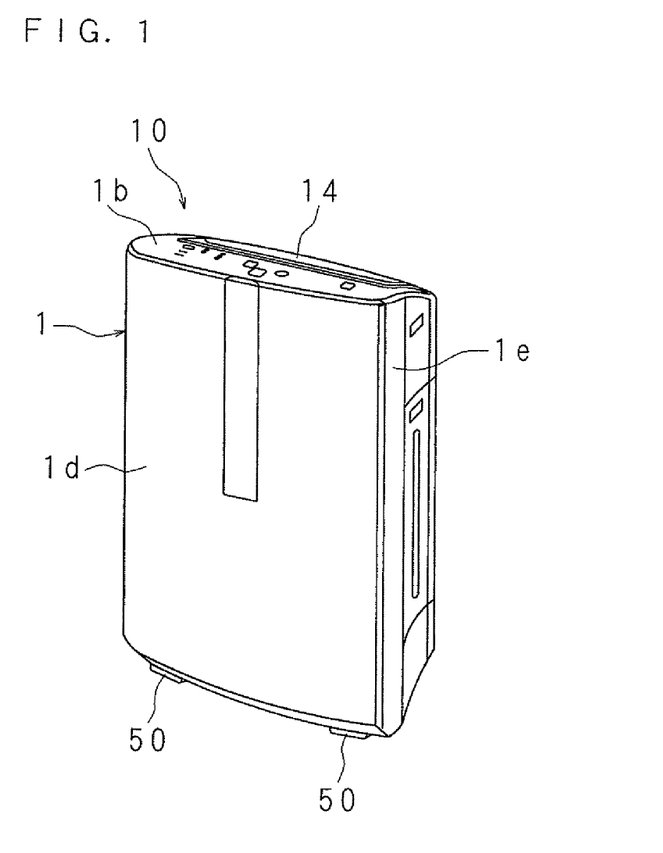
FIG. 1 is a front perspective view of an air purifier according to a first embodiment of the present invention.
Figure 2:
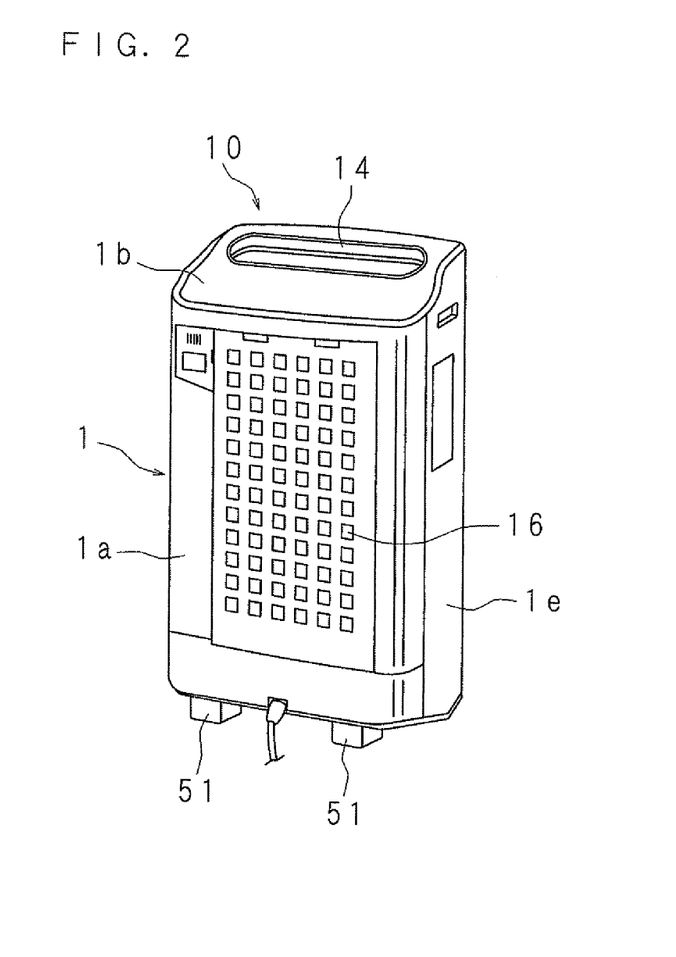
FIG. 2 is a back perspective view of the air purifier illustrated in FIG. 1.
Figure 3:
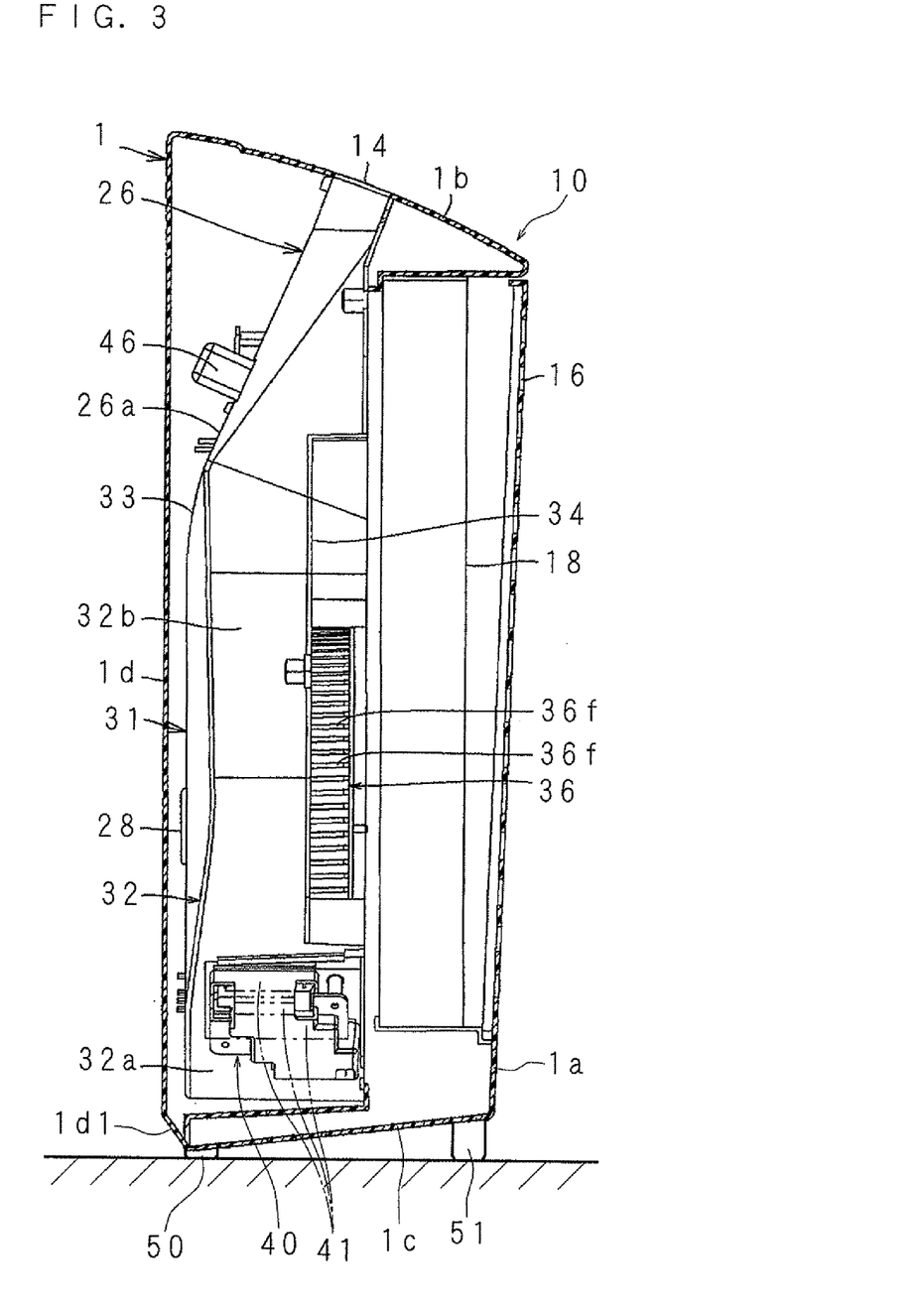
FIG. 3 is a longitudinal sectional view illustrating the internal structure of the air purifier illustrated in FIG. 1.
Figure 4:
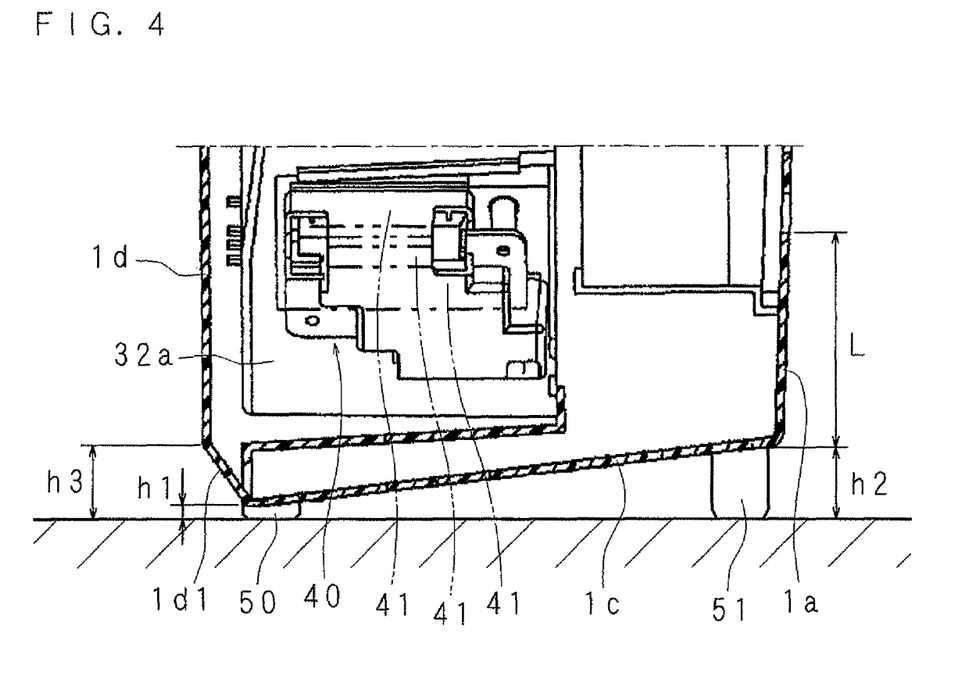
FIG. 4 is an enlarged sectional view illustrating the vicinity of a leg unit of the air purifier illustrated in FIG. 1.

FIG. 1 is a front perspective view of an air purifier according to a first embodiment of the present invention, FIG. 2 is a back perspective view of the air purifier illustrated in FIG. 1, FIG. 3 is a longitudinal sectional view illustrating the internal structure of the air purifier illustrated in FIG. 1, and FIG. 4 is an enlarged sectional view illustrating the vicinity of a leg unit of the air purifier illustrated in FIG. 1. In FIG. 3, the left side is the front side, and the right side is the back side.

An air purifier 10 includes a housing 1. A blower 31, a duct 26, a filter 18, ion generating devices 40 and 46, and the like are disposed in the housing 1.

The housing 1 has an upright substantially rectangular parallelepiped shape and includes a back wall 1$a$, a top wall 1$b$, a bottom wall 1$c$, a front wall 1$d$, and side walls 1$e$. The bottom wall 1$c$ has a substantially rectangular shape in plan view. When the air purifier 10 is placed on a floor, the bottom wall 1$c$ serves as a bottom portion of the housing 1 that faces a floor surface (placement surface). The top wall 1$b$ has the same shape as the bottom wall 1$c$ in plan view. A back part of the top wall 1$b$ is inclined downward. The back wall 1$a$ and the front wall 1$d$ are disposed so as to extend substantially parallel to each other and face each other. The back wall 1$a$ serves as a back portion of the housing 1, and the front wall 1$d$ serves as a front portion of the housing 1. The side walls 1$e$ serve as side portions of the housing 1. Generally, the air purifier 10 is placed near a wall in a room such that the back wall 1$a$ faces the wall in the room.

A lower end portion 1$d$1 of the front wall 1$d$ of the housing 1 is bent backward from a position at a distance h3 from the floor surface and forms an inclined surface that is connected to a front end portion of the bottom wall 1$c$, which is inclined downward toward the front side. A plurality of air inlets 16, through which air in a room is sucked in, is formed in the back wall 1$a$ of the housing 1. Each of the air inlets 16 has a rectangular shape whose longitudinal direction is the vertical direction. The air inlets 16 are arranged two-dimensionally in the vertical and horizontal directions with intervals therebetween.

An air outlet 14, through which purified air is blown into a room, is formed in the top wall 1$b$ of the housing 1. In the present embodiment, the air outlet 14 has a substantially oval opening whose transversal direction is the direction in which the back wall 1$a$ and the front wall 1$d$ face each other. The shape of the opening of the air outlet 14 is not limited to the oval shape and may be, for example, a rectangular shape or a shape in which a plurality of slits are arranged. The air outlet 14 need not be formed in the top wall 1$b$ and may be formed, for example, in the front wall 1$d$.

The filter 18 is a HEPA (High Efficiency Particulate Air) filter and is disposed in the housing 1 so as to face the air inlets 16. Air that has been sucked into the housing 1 through the air inlets 16 becomes purified air as the air passes through the filter 18 and foreign substances are removed.

The blower 31 sucks room air into the housing 1 and blows the air, which has been purified by the filter 18, into the room through the air outlet 14. Hereinafter, the structure of the blower 31 will be described in detail.

The blower 31 is a centrifugal fan (sirocco fan) that includes an impeller 36 and a casing 32 in which the impeller 36 is rotatably mounted. The impeller 36 has a cylindrical shape and has a rotation axis extending in the front-back direction. The impeller 36 is disposed in front of the filter 18. The impeller 36 is a multi-blade impeller that includes a plurality of blades 36$f$ whose portions near the rotation center are displaced in the rotation direction relative to the outer edges. The impeller 36 includes a bearing plate at one end thereof in the rotation axis direction. An output shaft of a motor 28 for driving a fan is attached to a shaft hole formed at the center of the bearing plate. When the motor 28 is driven, the impeller 36 sucks air into a hollow space in a central portion thereof through an opening at the other end in the rotation axis direction and releases air from spaces between the blades 36f in the outer peripheral portion.

The casing 32 includes a guide wall 32a that has an arc shape and an air outlet portion 32b that has a rectangular pipe shape having an opening facing upward. The air outlet portion 32b protrudes from a part of the guide wall 32a in one of the tangential directions of the guide wall 32a. The guide wall 32a guides airflow that is generated by rotation of the impeller 36 toward the rotation direction of the impeller 36 and increases the speed of the airflow.

The casing 32 is a combination of a casing body 33 that has a bowl shape and a cover plate 34 that blocks an opening side of the casing body 33. The casing body 33 forms the guide wall 32a and an opening portion for the air outlet portion 32b. The cover plate 34 is attached to the casing body 33 using a plurality of male screws.

The duct 26 is disposed above the blower 31 and has a rectangular pipe shape having an opening at the upper end. The upper end of the duct 26 is connected to the air outlet 14, and the lower end of the duct 26 is connected to the air outlet portion 32b of the blower 31. The duct 26 includes a front wall 26a that faces the front wall 1d of the housing 1 and that is inclined toward the back side. The duct 26 is integrally formed with the casing body 33 and the cover plate 34. The duct 26 functions as an air guide passage for guiding purified air blown out of the air outlet portion 32b toward the air outlet 14.

In the present embodiment, a first ion generating device 40 is attached to the guide wall 32a of the casing 32, and a second ion generating device 46 is attached to the front wall 26a of the duct 26. The ion generating devices 40 and 46 include ion generating units 41, and generate positive ions and negative ions.

A leg unit is disposed on the bottom wall 1c of the casing 1, and a gap, through which air flows, is formed between the bottom wall 1c and the floor surface. To be specific, four legs are attached to the four corners of the bottom wall 1c, and the length of legs 50 on the front side is shorter than the length of the legs 51 on the back side. Thus, a gap h1 between the front end of the bottom wall 1c and the floor surface is narrower than a gap h2 between the back end of the bottom wall 1c and the floor surface.

Figure 5A:
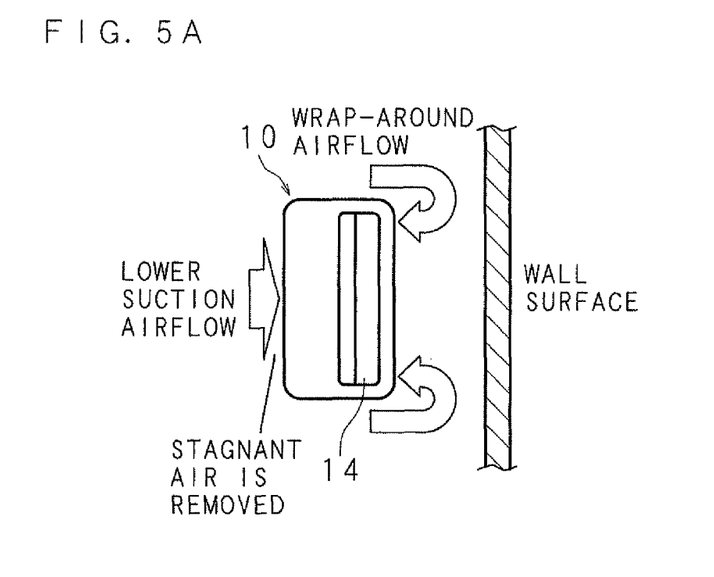
FIG. 5A illustrates airflow during the operation of an air purifier according to the present invention.
Figure 5B:
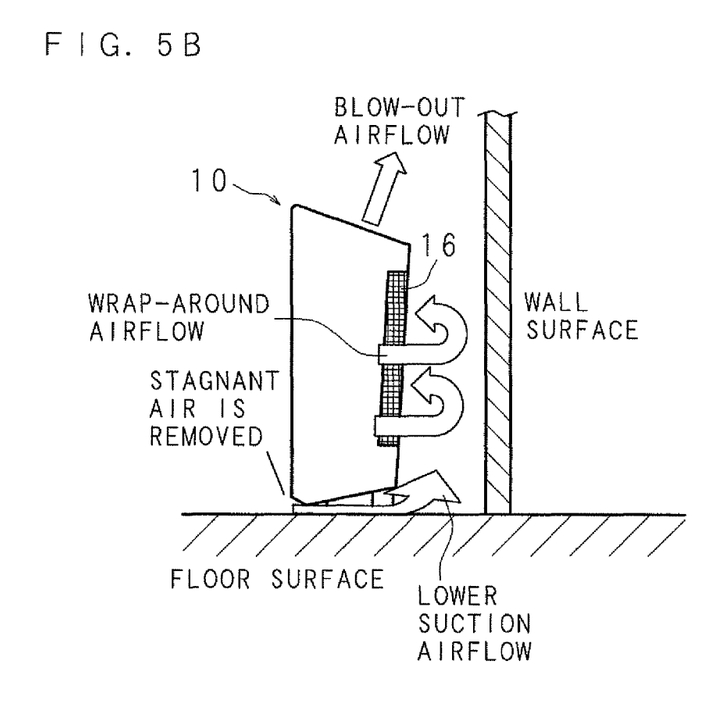
FIG. 5B illustrates airflow during the operation of the air purifier according to the present invention.
Figure 6A:
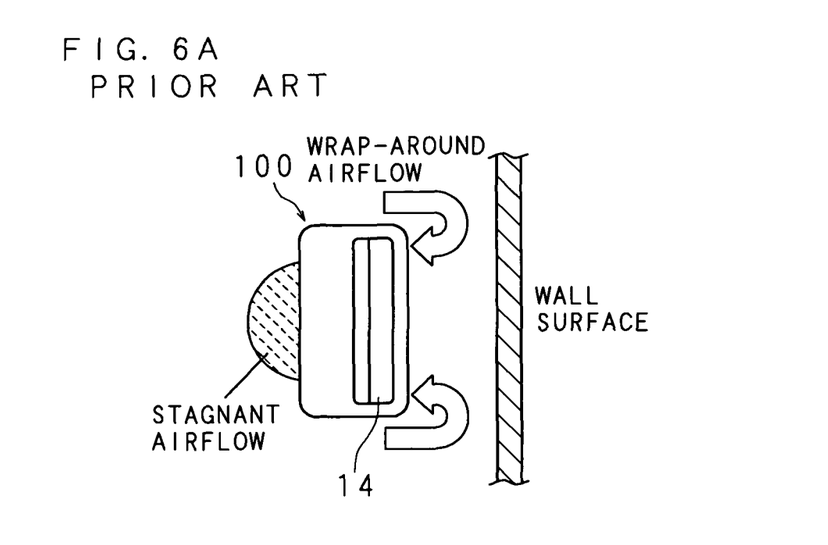
FIG. 6A illustrates airflow during the operation of an air purifier according to a comparative example.
Figure 6B:
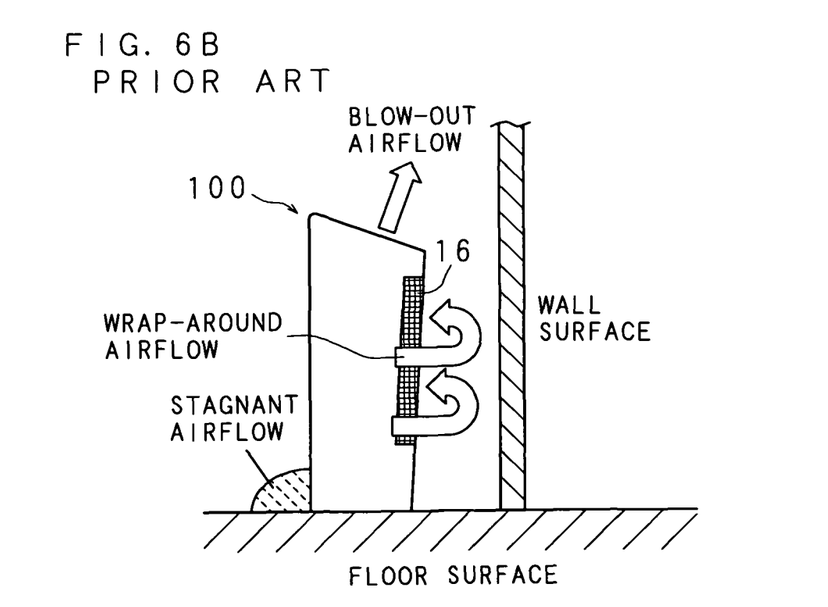
FIG. 6B illustrates airflow during the operation of the air purifier according to the comparative example.

Next, the operation of the air purifier 10 will be described. FIGS. 5A and 5B illustrate airflow generated during the operation of an air purifier according to the present invention, and FIGS. 6A and 6B illustrate airflow generated during the operation of an air purifier according to a comparative example. Note that, when the air purifier according to the comparative example is placed on a floor surface, a gap through which air flows is not formed between the bottom surface of the casing and the floor surface. FIGS. 5A and 6A are plan views, and FIGS. 5B and 6B are side views.

When the blower 31 is driven, the impeller 36 rotates and generates airflow with which air in a room is sucked into the housing 1 through the air inlets 16. The filter 18 removes foreign substances, such as dust, from the air sucked into the housing 1. Purified air, which has passed through the filter 18, is sucked into the casing 32, and forms a laminar flow due to the presence of the guide wall 32a surrounding the impeller 36. The laminar flow of the air is guided toward the air outlet portion 32b along the guide wall 32a, and the air is blown into the duct 26 from the air outlet portion 32b.

The ion generating device 40, which is disposed on the guide wall 32a, generates positive ions and negative ions in the purified air that flows along the guide wall 32a. Moreover, the ion generating device 46, which is disposed on the front wall 26a of the duct 26, generates positive ions and negative ions in the purified air that flows through the duct 26, thereby increasing the amount of positive ions and negative ions in the purified air. The positive and negative ions, which have been generated by the ion generating devices 40 and 46, are released to the outer space together with the purified air through the air outlet 14. At this time, airflow from the air outlet 14 to the outside is generated.

Usually, air in a region of up to a height of about 30 cm from a floor surface, which is called a stagnant region, hardly moves. When a floor-standing air purifier is placed on a floor surface, air circulates since airflow is forcibly formed as a result of blowing. However, air in the vicinity of the floor surface of up to several centimeters from the floor surface does not move easily due to friction between the air and the floor surface. Under such conditions, air in the vicinity of the air inlets 16 is sucked in at first, and the pressure of the air turns relatively negative to the surrounding air, so that the negative pressure drives the surrounding air toward the air inlets 16.

However, immediately after the operation has been started, dust and pollen in the vicinity of the floor surface do not move. After the operation has been started and when circulating airflow has been formed in a room as the air purifier 10 sucks and blows air, dust and pollen near the floor surface start moving toward the air purifier 10 and reach the air inlets 16 together with surrounding airflow. With a back-inlet-type air purifier, the air pressure in a space between the apparatus and a wall behind the apparatus becomes negative, and the surrounding air flows into this space. In this case, with the air purifier 10 according to the present invention, in addition to air flowing around the side surfaces, stagnant air on the lower front side moves toward the back side due to airflow passing through the gap between the bottom wall 1c and the floor surface, and thereby the stagnant air is easily removed. On the other hand, with an air purifier 100 according to the comparative example, stagnant air on the lower front side is not easily removed, because airflow exists only around the side surfaces.

As illustrated in FIG. 4, with the air purifier 10 according to the present invention, the shorter the distance L from the position at which the back wall 1a and the bottom wall 1c of the housing 1 intersect each other to the lower end of the air inlets 16 on the back side, the larger the influence of negative pressure on the back side of the housing 1 on the airflow passing through the gap between the bottom wall 1c and the floor surface, and the more easily air is sucked in from the floor surface. The larger the gaps h1 and h2 between the bottom wall 1c and the floor surface, the more easily air flows through the gap between the bottom wall 1c and the floor surface.

On the other hand, if the gap h1 between the bottom wall 1c on the front side and the floor surface is too large, the legs 50 on the front side become too long and the stability and the aesthetic in appearance of the air purifier 10 are impaired. Therefore, with the air purifier 10 according to the present invention, by increasing the gap h2 on the back side while reducing the gap h1 on the front side, it becomes possible to increase air-sucking efficiency while preventing the air purifier 10 from looking unstable and maintaining its aesthetic in appearance. Moreover, the lower end portion 1d1 of the front wall 1d, which extends to the gap h1 between the front wall 1d and the floor surface, is formed as an inclined surface connected to the bottom wall 1c. Therefore, resistance to flow of air that is sucked into the gap between the bottom surface and the floor surface from the lower front side of the air purifier 10 is reduced, so that the air flows smoothly and stagnant air is easily removed. Furthermore, the gap h1 on the front side, which is narrow, serves as a nozzle and increases the airflow speed, so that dust and the like on the floor surface are sucked up with a higher power with a lower effect of dust adhesion. It is preferable that the height h3, from the floor surface, of a ridge at which the lower end portion 1d1 of the front wall 1d is bent toward the bottom wall 1c be larger than the maximum height of stagnant air. However, considering that priority may be placed on the aesthetic in appearance, it is preferable that the height h3 be smaller than about 10 cm.

In the first embodiment, the four legs 50 and 51 are disposed on the four corners of the bottom surface (the bottom wall 1c) of the housing 1. However, this is not necessarily the case. For example, at least three legs may be disposed on the bottom surface by, for example, disposing two legs on the left and right front corners and one leg at the middle of a back portion of the bottom surface.

(Second Embodiment)

Figure 7:
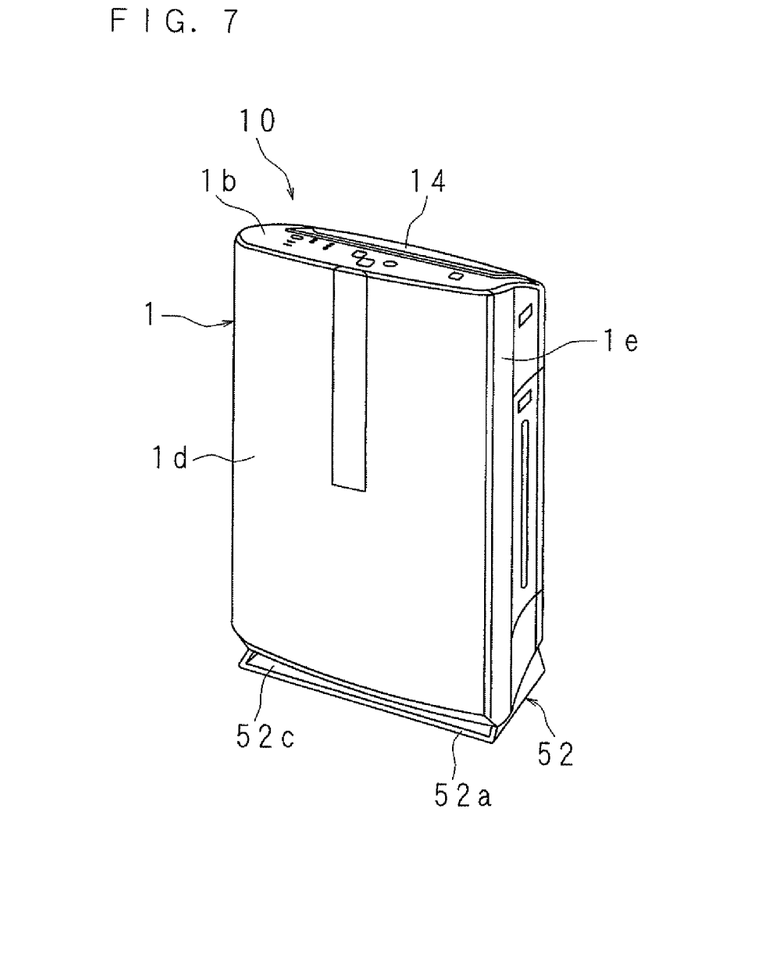
FIG. 7 is a front perspective view of an air purifier according to a second embodiment of the present invention.
Figure 8:
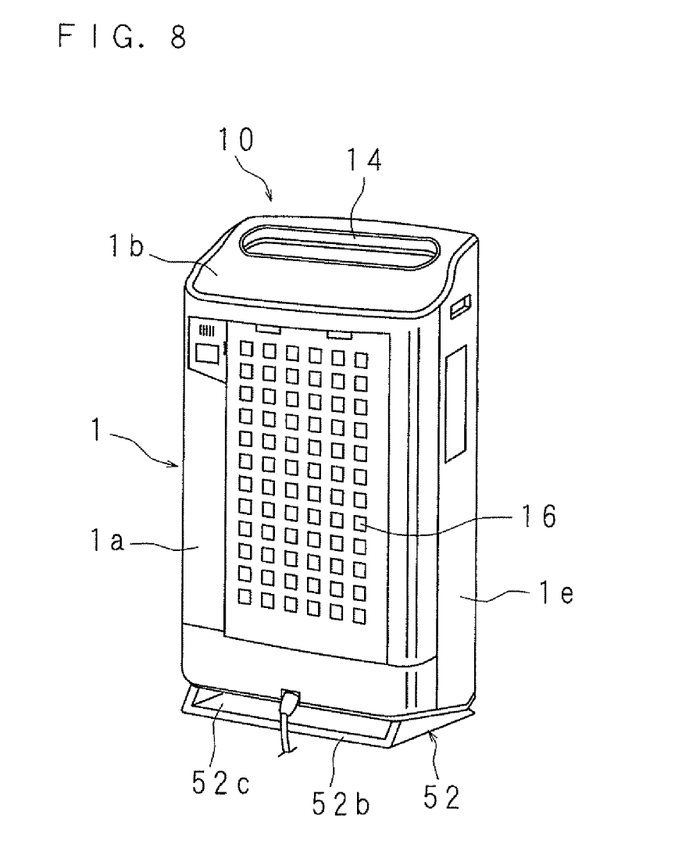
FIG. 8 is a back perspective view of the air purifier illustrated in FIG. 7.
Figure 9:
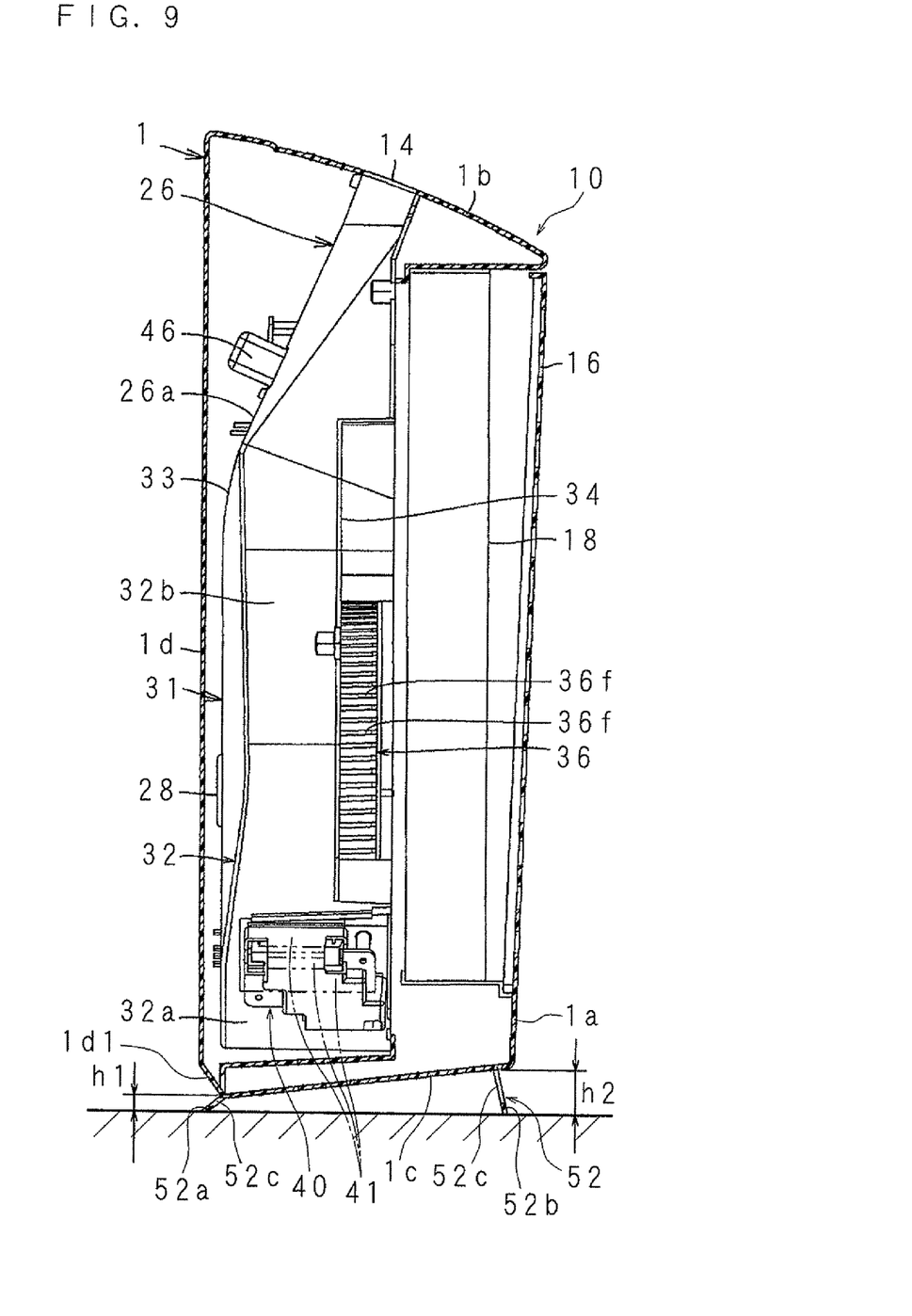
FIG. 9 is a longitudinal sectional view illustrating the internal structure of the air purifier illustrated in FIG. 7.

FIG. 7 is a front perspective view of an air purifier according to a second embodiment of the present invention, FIG. 8 is a back perspective view of the air purifier illustrated in FIG. 7, and FIG. 9 is a longitudinal sectional view illustrating the internal structure of the air purifier illustrated in FIG. 7. The second embodiment differs from the first embodiment only in terms of the structure of the leg unit.

The leg unit of the second embodiment is a wall member 52 integrally formed with the bottom wall 1c of the housing 1. The wall member 52 has a rectangular ring-like shape extending along the peripheral edge of the bottom wall 1c. An end of the wall member 52, which protrudes downward, is placed on the floor surface. The wall member 52 includes wall portions 52a and 52b, which face each other, on the front and back sides thereof. Openings 52c, through which air flows, are formed in the wall portions 52a and 52b. As with the first embodiment, the height of the wall portion 52a on the front side is smaller than the height of the wall portion 52b on the back side, so that the gap h1 between the bottom wall 1c of the housing 1 and the floor surface is narrower than the gap h2 on the back side. Moreover, the vertical dimension of the opening 52c in the wall portion 52a on the front side is smaller than the vertical dimension of an opening 52c in the wall portion 52b on the back side.

In the embodiments described above, the air inlets 16 are formed in the back surface (the back wall 1a) of the housing 1. However, this is not necessarily the case, and the air inlets 16 may be formed in a side surface (side wall 1e) of the housing 1. In the case of forming the air inlets in a side surface (side wall 1e) of the housing 1 in the second embodiment, openings through which air flows are formed in the wall portions on the front side and on the side of the wall member 52.

In the embodiments described above, the lower end portion 1d1 of the front wall 1d of the housing 1 is formed as an inclined surface that is connected to the front end of the bottom wall 1c. Alternatively, the lower end portion 1d1 of the front wall 1d may be formed as, instead of an inclined surface, an outwardly convex curved surface that is connected to the front end of the bottom wall 1c. As a further alternative, instead of the lower end portion of the front wall 1d, a front end portion of the bottom wall 1c may be formed as an inclined surface or a curved surface that is connected to the lower end of the front wall 1d. Also, both the lower end portion of the front wall 1d and the front end portion of the bottom wall 1c may be formed as inclined surfaces or curved surfaces that are connected to each other. In any of these cases, as in the embodiments described above, an airflow resistance reduction effect can be obtained.

In the embodiments described above, an air purifier is used as an example for an air adjuster according to the present invention. However, the present invention can also be applied to various air adjusters such as humidifiers and air conditioners placed on a floor or a table. In particular, the present invention can be selectively applied to any types of air adjusters having an air inlet in a part thereof that does not face a user (the back surface or the side surfaces of the casing) in order to provide a low noise air intake performance.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. An air adjuster comprising a housing in which an air inlet and an air outlet are formed; a blower that is disposed in the housing and that sucks in air through the air inlet; and a conditioning unit that is disposed in the housing and that conditions the air sucked in by the blower, the air that has been conditioned by the conditioning unit being blown to the outside through the air outlet, wherein the air inlet is formed only in a back surface of the housing, wherein the air outlet is formed in an upper surface of the housing, and wherein the housing allows the air to pass through a space between a bottom surface thereof and a placement surface, and the housing is provided with a leg wherein the leg unit has a fixed inclination relative to the housing and forms a gap whose vertical dimension on a front side is smaller than a vertical dimension on a back side the gap being open on the front side and the back side to permit air flow from the front side to the back side of the housing via the gap such that the air flow may enter the air inlet.

2. The air adjuster according to claim 1, wherein at least one of a lower end portion of a front surface and a front end portion of the bottom surface of the housing is formed as an inclined surface or a curved surface that is connected to the other of the lower end portion of the front surface and the front end portion of the bottom surface.

3. The air adjuster according to claim 2, wherein the leg unit is a plurality of legs that are disposed at least at three positions on the bottom surface of the housing.

4. The air adjuster according to claim 2, wherein the leg unit is a wall member that has four side portions extending along a peripheral edge of the bottom surface of the housing so as to face downward, an opening is formed in each of a side portion at a front surface side and a side portion at a back surface side.

5. The air adjuster according to claim 1, wherein the leg unit is a plurality of legs that are disposed at least at three positions on the bottom surface of the housing.

6. The air adjuster according to claim 1, wherein the leg unit is a wall member that has four side portions extending along a peripheral edge of the bottom surface of the housing so as to face downward, an opening is formed in each of a side portion at a front surface side and a side portion at a back surface side.

* * * * *